United States Patent
Szul et al.

(10) Patent No.: US 11,396,561 B2
(45) Date of Patent: Jul. 26, 2022

(54) CONTROLLING A POLYMERIZATION REACTION

(71) Applicant: Univation Technologies, LLC, Houston, TX (US)

(72) Inventors: John F. Szul, S. Charleston, WV (US); Daniel N. Thomas, S. Charleston, WV (US); Eric J. Markel, Kingwood, TX (US); R. Eric Pequeno, Baytown, TX (US); Bruce J. Savatsky, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 94 days.

(21) Appl. No.: 17/042,255

(22) PCT Filed: Mar. 20, 2019

(86) PCT No.: PCT/US2019/023074
§ 371 (c)(1),
(2) Date: Sep. 28, 2020

(87) PCT Pub. No.: WO2019/190841
PCT Pub. Date: Oct. 3, 2019

(65) Prior Publication Data
US 2021/0047442 A1 Feb. 18, 2021

Related U.S. Application Data

(60) Provisional application No. 62/649,059, filed on Mar. 28, 2018.

(51) Int. Cl.
*C08F 2/34* (2006.01)
*C08F 4/6592* (2006.01)
*C08F 210/16* (2006.01)
*C08F 4/659* (2006.01)

(52) U.S. Cl.
CPC ............ *C08F 4/65925* (2013.01); *C08F 2/34* (2013.01); *C08F 4/65916* (2013.01); *C08F 210/16* (2013.01)

(58) Field of Classification Search
CPC .......... C08F 2/00; C08F 2/34; C08F 4/65925; C08F 210/16
See application file for complete search history.

(56) References Cited

U.S. PATENT DOCUMENTS

| | | |
|---|---|---|
| 5,627,242 A | 5/1997 | Jacobsen et al. |
| 7,078,467 B1 | 7/2006 | Kolb et al. |
| 8,497,329 B2 | 7/2013 | Kolb et al. |
| 2005/0058847 A1 | 3/2005 | Szul et al. |
| 2006/0136149 A1 | 6/2006 | Long et al. |
| 2015/0210782 A1 | 7/2015 | Hari et al. |

OTHER PUBLICATIONS

International Search Report & Written Opinion for related PCT Application PCT/US2019/023074, dated Jul. 5, 2019 (12 pgs).
International Preliminary Report on Patentability related PCT Application PCT/US201 9/023074, dated Oct. 8, 2020 (8 pgs).
Kang, et al., "On-Line Property Prediction for Industrial Slurry High-Density Polyethylene Processes with Various Grade Transition Modes"; Journal of Chemical Engineering of Japan, vol. 43, No. 7 (Jul. 20, 2010) (14 pgs).
Sato, et al., "Modeling, simulation and nonlinear control of a gas-phase polymerization process"; Computers and Chemical Engineering, vol. 24 (Oct. 23, 2001) (7 pgs).
McAuley, et al., "On-Line Inference of Polymer Properties in an Industrial Polyethylene Reactor"; American Institute of Chemical Engineers Journal, vol. 37, No. 6 (Jun. 30, 1991) (11 pgs).

*Primary Examiner* — Caixia Lu
(74) *Attorney, Agent, or Firm* — Brooks, Cameron & Huebsch, PLLC

(57) ABSTRACT

Embodiments of the present disclosure are directed towards methods for controlling a polymerization reaction including determining an instantaneous density model for a gas-phase polymerization, and utilizing the instantaneous density model to monitor the polymerization reaction to determine if a threshold instantaneous density is reached.

10 Claims, 1 Drawing Sheet

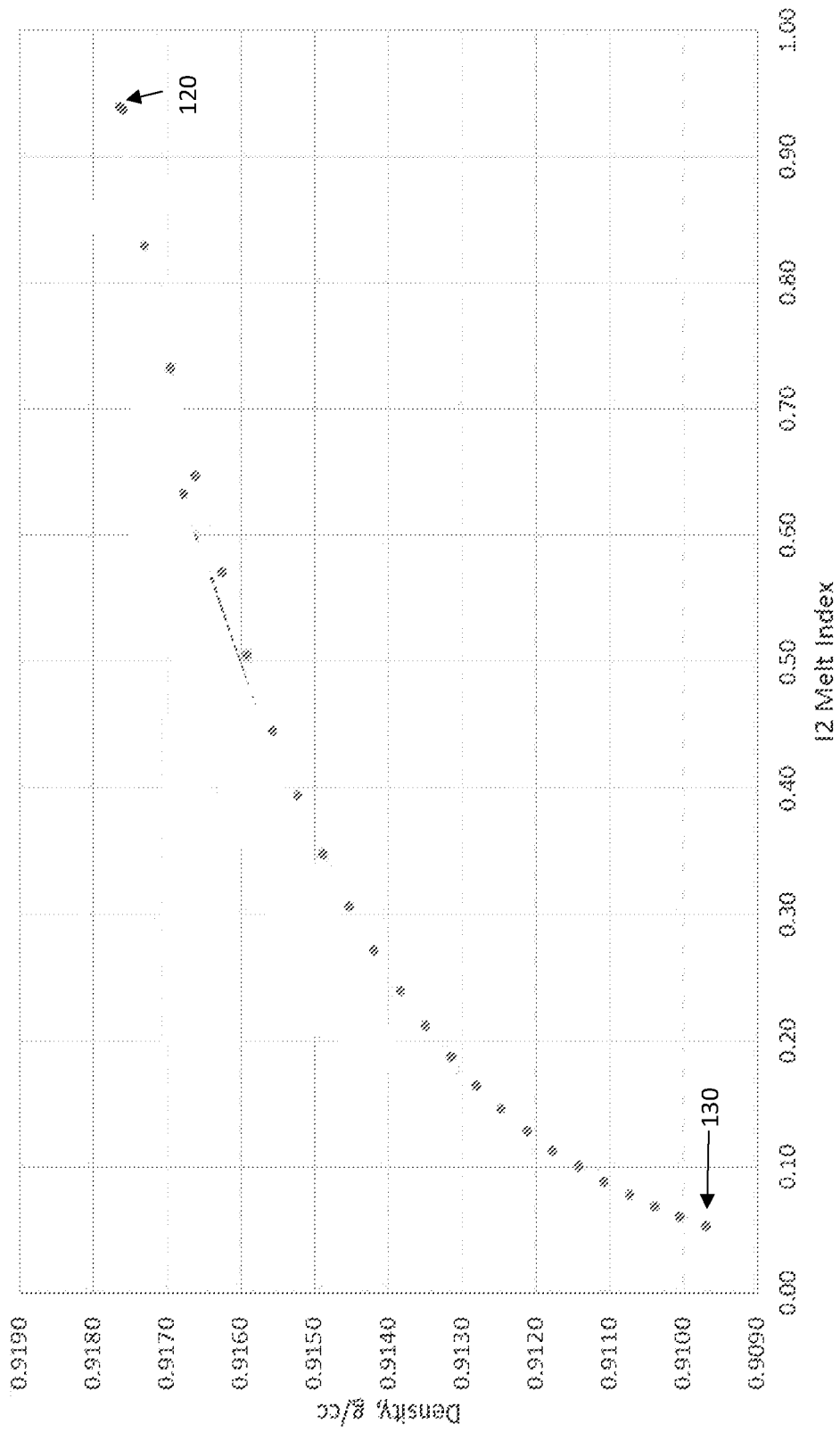

CONTROLLING A POLYMERIZATION REACTION

This application is a National Stage Application under 35 U.S.C. § 371 of International Application Number PCT/US2019/023074, filed Mar. 20, 2019 and published as WO 2019/190841 on Oct. 3, 2019 which claims the benefit to U.S. Provisional Application 62/649,059, filed Mar. 28, 2018, the entire contents of which are incorporated herein by reference in its entirety

FIELD OF DISCLOSURE

Embodiments of the present disclosure are directed towards methods for controlling a polymerization reaction; more specifically, embodiments are directed towards determining an instantaneous density model for a gas-phase polymerization and utilizing the instantaneous density model to monitor the polymerization reaction to determine if a threshold instantaneous density is reached.

BACKGROUND

Polymers may be utilized for a number of products including films, among others. Polymers can be formed by reacting one or more types of monomer in a polymerization reaction. There is continued focus in the industry on developing new and improved materials and/or methods that may be utilized to form polymers. In addition, there is a continued focus on developing improved methods of controlling the process operation, especially during process upsets and product grade transitions.

BRIEF DESCRIPTION OF THE DRAWINGS

FIG. 1 illustrates a plot of density (g/cm$^3$) vs I$_2$ melt index.

SUMMARY

The present disclosure provides methods for controlling a polymerization reaction, the method including: determining an instantaneous density model for a gas-phase activated metallocene complex polymerization, wherein the instantaneous density model incorporates: a hydrogen concentration for the gas-phase activated metallocene complex polymerization and a comonomer concentration for the gas-phase activated metallocene complex polymerization; and utilizing the instantaneous density model to monitor the polymerization reaction to determine if the threshold instantaneous density is reached.

One or more embodiments provide that the activated metallocene complex of the gas-phase activated metallocene complex polymerization is provided by activating a metallocene complex represented by Formula I:

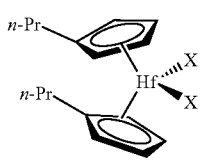

Formula I wherein each n-Pr is n-propyl, and each X is independently CH3, Cl, Br, or F.

One or more embodiments provide that the instantaneous density incorporates instantaneous process conditions determined from a mass balance in-between analyzer updates.

One or more embodiments provide that the threshold instantaneous density is determined from a stickiness model.

One or more embodiments provide that the threshold instantaneous density is determined from a stickiness model using instantaneous process conditions determined from a mass balance in-between analyzer updates.

One or more embodiments provide that the threshold instantaneous density is a preset value.

One or more embodiments provide killing the polymerization reaction when the threshold instantaneous density is reached.

One or more embodiments provide that killing the polymerization reaction includes slowing and/or stopping the polymerization reaction.

One or more embodiments provide that killing the polymerization reaction includes injecting a kill material into a polymerization reactor.

One or more embodiments provide that the kill material is carbon monoxide.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polymers can have a variety of properties, such as density, melt index, and melt index ratio, among others. These properties may be varied by changes to polymerization parameters such as hydrogen concentration, monomer concentration, reaction temperature, comonomer flow ratio, and/or reaction temperature, among others. However, a number of values for some polymer properties may be more sensitive, e.g. more apt to vary and/or having a greater variance, when utilizing a particular polymer catalyst, as compared to other polymer catalysts.

Activated metallocenes may be utilized as catalysts for the production of a number of various polymers. It has been found that metallocene complex of Formula I,

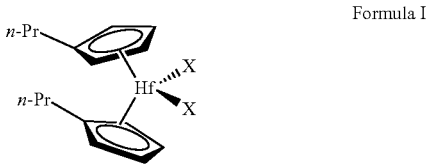

Formula I where each n-Pr is n-propyl, and each X is independently CH$_3$, Cl, Br, or F, when activated and utilized as a polymerization catalyst, has an increased hydrogen response, as compared to a number of other activated metallocenes.

This increased hydrogen response can have significant implications for polymerizations utilizing the activated metallocene complex of Formula I. For instance, a reduction of hydrogen concentration, for a polymerization that utilizes the activated metallocene complex of Formula I, can result in a polymer that has a correspondingly, significantly lower density. This lower density can result in undesirable increased bed stickiness, which can result in chuck formation in the polymerization reactor.

Previously, control systems have utilized analyzers to monitor polymerization reactions. These analyzers, known in the art, have been utilized to monitor a number of variables, including concentrations, e.g., hydrogen concentration, temperatures, pressures, and flow rates, among others. Additionally, previous control systems have utilized bed average density. As used herein, "bed average density" refers to a polymer density as the polymer exits the polymerization reactor.

As mentioned, previous control systems have utilized analyzers to monitor the hydrogen concentration of polymerization reactions. While these analyzers may be utilized for monitoring the hydrogen concentration over specified time intervals, these analyzers may be less effective when an increased hydrogen response catalyst, i.e., the activated metallocene complex of Formula I, is utilized. Analyzers generally operate in a cycle of between 2 minutes to 6 minutes or 10 minutes or possibly more, indicating that gas composition in the reactor, as determined by the analyzers, may be time delayed. Due to the increased hydrogen response of the catalyst, even a very brief reduction in the hydrogen concentration over a short period of time may result in producing a polymer that has a correspondingly, significantly lower density. Further, this significantly lower density may not be detected in a timely manner due to the operation of the analyzer cycle and bed average density monitoring.

The present disclosure provides methods for controlling a polymerization reaction. Methods for controlling a polymerization reaction can include determining an instantaneous density model for a gas-phase activated metallocene complex polymerization, i.e. a gas-phase polymerization that utilizes an activated metallocene complex. In contrast to a bed average density, which provides a density as the polymer exits the polymerization reactor, the instantaneous density model can provide an instantaneous density, i.e., a density of the polymer presently being produced by the polymerization reaction within the polymerization reactor.

The instantaneous density model can incorporate, e.g., utilize, a number of know polymerization variables. Examples of these know polymerization variables include, but are not limited to, type of catalyst, type of continuity aid, catalyst density, number of polymerization reactor bed turnovers, residence time, monomer concentration, monomer partial pressure, hydrogen concentration, hydrogen to monomer ratio, comonomer concentration, comonomer to monomer ratio, monomer feed rate, hydrogen to monomer flow ratio, comonomer to monomer flow ratio, nitrogen concentration, reactor vent rate, reactor pressure, bed temperature, reactor gas velocity, bed weight, bed level, fluidized bed density, catalyst feed rate, reactor production rate, catalyst activity material balance, polymer melt index ($I_2$), polymer high load melt index ($I_{21}$), polymer melt flow ratio ($I_{21}/I_2$), and polymer bulk density, among others.

The instantaneous density model can utilize analytic methods, numerical methods, or combinations thereof. For example, a number of the polymerization variables incorporated by the instantaneous density model may be measured from and utilized for a presently occurring polymerization reaction. A number of the polymerization variables incorporated by the instantaneous density model may be measured from a previously occurring polymerization reaction. A number of the polymerization variables incorporated by the instantaneous density model may be calculated based upon a presently occurring polymerization reaction. A number of the polymerization variables incorporated by the instantaneous density model may be calculated based upon a previously occurring polymerization reaction.

One or more embodiments of the present disclosure provide that the instantaneous density model is based upon regression analysis. Regression analysis is a known set of statistical processes for determining relationships among variables. The regression analysis can utilize a number of the polymerization variables discussed herein. One or more embodiments of the present disclosure provide that the regression analysis utilizes polymerization variables determined, e.g., measured, from a number of previously occurring polymerization reactions. For instance, the regression analysis may utilize polymerization variables determined from one, two, three, four, five, or greater than five previously occurring polymerization reactions.

One or more embodiments of the present disclosure provide that the instantaneous density model is based upon instantaneous flows associated with a presently occurring polymerization reaction. For instance, the instantaneous density model can be based upon a material balance for the polymerization reactor. As an example, the instantaneous density may incorporate, e.g., be based at lease in part upon, instantaneous process conditions determined from mass balance in-between analyzer updates.

The instantaneous density model can be used to determine if the instantaneous density is lower than a threshold instantaneous density. The threshold instantaneous density is a density corresponding to an increased likelihood of an undesirable increased bed stickiness, which can result in chuck formation in the polymerization reactor. Embodiments of the present disclosure provide that the threshold instantaneous density is less than a target density, e.g., a desired density for a polymer product. For instance, if it is desired to produce a polymer having a density of 0.918 g/cm³, then the threshold instantaneous density will be less than 0.918 g/cm³. The threshold instantaneous density can have different values for various polymerizations.

In some embodiments, the threshold instantaneous density is based upon sticking correlations, such as those described in WO 2014/039519 A1, which is incorporated herein by reference. For instance, the threshold instantaneous density may be determined, e.g., calculated, from a stickiness model. Inputs into the sticking correlation can either be from GC analyzer values or from the same mass balance instantaneous process conditions used to determine the instantaneous density, for instance. As an example, the instantaneous density may be based at least in part upon a stickiness model that utilizes instantaneous process conditions determined from mass balance in-between analyzer updates. One or embodiments provides that the threshold instantaneous density is a preprogrammed value, e.g. a preset value.

Embodiments of the present disclosure provide that the instantaneous density model can be utilized to monitor a polymerization reaction. Utilizing the instantaneous density model to monitor a polymerization reaction can include determining if the threshold instantaneous density is reached. One or more embodiments of the present disclosure provide that if the threshold instantaneous density is reached the polymerization can be killed. Because the instantaneous density model can provide an instantaneous density, rather than a bed average density, determining if the threshold instantaneous density is reached can provide a number of advantages in polymer production. For instance, as mentioned, when the threshold instantaneous density is reached there is an increased likelihood of an undesirable increased bed stickiness, which can result in chuck formation in the polymerization reactor. Because the bed average density is the polymer density as the polymer exits the polymerization reactor, the bed average density of a polymerization may be determined to be within process limits, while the threshold instantaneous density is reached. Polymer production recovery from chunk formation can require extended down time from polymer production. However, polymer production recovery, e.g., returning to polymer production within desired process limits, from killing the polymerization is much quicker that polymer production recovery from chunk formation. As used herein, "killing the polymerization" refers to slowing and/or stopping the polymerization reaction. Killing the polymerization may be performed by a process know in the art. For instance, killing the polymerization may be performed by injecting a known kill material into the polymerization reactor. As an example, for some polymerizations carbon monoxide may be utilized as a kill material. Advantageously, chunk formation and the associated extended down time from polymer production may be reduced by killing the polymerization if the threshold instantaneous density is reached.

Embodiments of the present disclosure provide that the instantaneous density model incorporates activating the metallocene complex represented by Formula I:

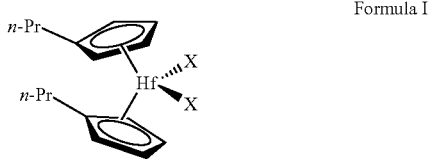

Formula I wherein each n-Pr is n-propyl, and each X is independently $CH_3$, Cl, Br, or F to provide an activated metallocene complex. The metallocene complex represented by Formula I may be prepared by a known process, such as by repeated deprotanations/metallations of the aromatic ligands and introduction of the bridge and the central atom by their halogen derivatives. Known processes for preparing metallocenes are discussed in the Journal of Organometallic Chem., volume 288, (1985), pages 63-67, and EP-A-320762. Both documents are herein fully incorporated by reference. Additionally, the metallocene complex of Formula I and/or a corresponding activated metallocene complex may be obtained commercially, e.g., under the trade name XCAT™ VP-100, obtainable from Univation Technologies, LLC.

One or more embodiments of the present disclosure provide utilizing a supported metallocene complex. The supported metallocene complex can include the metallocene complex of Formula I and a support material. The supported metallocene complex may include other components known in the art.

The supported metallocene complex may be formed by a known process. For instance, the supported metallocene complex may be formed by a slurry process. The slurry can include components of the supported metallocene complex, i.e., the metallocene complex of Formula I and the support material, and optionally other known components. For example, the slurry may include an activator, such as alumoxane and/or a modified alumoxane. The slurry can include an activator and/or or a supported activator. In one embodiment, the slurry includes a support material, an activator, and the metallocene complex of Formula I. A molar ratio of metal in the activator to metal in the metallocene complex of Formula I may be 1000:1 to 0.5:1, 300:1 to 1:1, or 150:1 to 1:1. Combining a metallocene complex, i.e. the metallocene complex of Formula I, with an activator can provide a catalyst, e.g. an activated metallocene complex.

The support material which may be any inert particulate carrier material known in the art, including, but not limited to, silica, fumed silica, alumina, clay, or talc, among other support materials. In one embodiment, the slurry contains silica and an activator, such as methyl aluminoxane ("MAO"), modified methyl aluminoxane ("MMAO"), as discussed further below.

As used herein, the terms "support material", "support", and "carrier" may be used interchangeably and refer to any support material, including a porous support material, such as talc, inorganic oxides, and inorganic chlorides. The metallocene complex of Formula I may be on the same as the activator, or the activator can be used in an unsupported form, or can be deposited on a support different from the metallocene complex of Formula I. This may be accomplished by any technique commonly used in the art.

The support material can include one or more inorganic oxides, for example, of Group 2, 3, 4, 5, 13, or 14 elements. The inorganic oxide can include, but is not limited to silica, alumina, titania, zirconia, boria, zinc oxide, magnesia, or combinations thereof. Illustrative combinations of inorganic oxides can include, but are not limited to, alumina-silica, silica-titania, alumina-silica-titania, alumina-zirconia, alumina-titania, and the like. The support material can be or include alumina, silica, or a combination thereof. In one embodiment, the support material is silica.

Suitable commercially available silica supports can include, but are not limited to, ES757, ES70, and ES70W available from PQ Corporation. Suitable commercially available silica-alumina supports can include, but are not limited to, SIRA® 1, SIRAL® 5, SIRAL® 10, SIRAL® 20, SIRAL® 28M, SIRAL® 30, and SIRAL® 40, available from SASOL®. Supports comprising silica gels with activators, such as MAOs, can be used. Suitable supports may also be selected from the CAB-O-SIL® materials available from Cabot Corporation and silica materials available from the Grace division of W.R. Grace & Company. Supports may also include polymers that are covalently bonded to a ligand on the catalyst. For example, two or more catalyst molecules may be bonded to a single polyolefin chain.

As used herein, the term "activator" refers to any compound or combination of compounds, supported, or unsupported, which can activate a complex or a catalyst component, such as by creating a cationic species of the catalyst component. For example, this can include the abstraction of at least one leaving group (the "X" group described herein) from the metal center of the complex/catalyst component, e.g. the metallocene complex of Formula I. The activator may also be referred to as a "co-catalyst".

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-(CF$_3$)$_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl)boron, a tris(perfluoronaphthyl)boron, tris(perfluorophenyl)aluminum, a tris(perfluoronaphthyl)aluminum, or any combinations thereof.

The activator may or may not bind directly to the support surface or may be modified to allow them to be bound to a support surface, e.g., via a tethering agent. Such tethering agents may be derived from groups that are reactive with surface hydroxyl species. Non-limiting examples of reactive functional groups that can be used to create tethers include aluminum halides, aluminum hydrides, aluminum alkyls, aluminum aryls, sluminum alkoxides, electrophilic silicon reagents, alkoxy silanes, amino silanes, boranes.

Aluminoxanes can be referred to as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3 A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

As used herein a "polymer" has two or more polymer units derived from monomers and/or comonomers. A "copolymer" is a polymer having two or more polymer units that are different from each other. Herein, polymer and copolymer may be used interchangeably. As used herein a "polymerization" and/or a "polymerization process" is a process that is utilized to form a polymer.

As used herein, when a polymer or copolymer is referred to as comprising, e.g., being formed from, an olefin, the olefin present in such polymer or copolymer is the polymerized form of the olefin. For example, when a polymer is said to have an ethylene content of 75 wt % to 85 wt %, it is understood that the polymer unit is derived from ethylene in the polymerization reaction and the derived units are present at 75 wt % to 85 wt %, based upon the total weight of the polymer.

Embodiments of present disclosure include polymers, i.e., polyethylene, made from a monomer, i.e., ethylene, and/or linear or branched higher alpha-olefin comonomers containing 3 to 20 carbon atoms. Examples of the comonomer include, but are not limited to, propylene, 1-butene, 1-pentene, 1-hexene, 4-methyl-1-pentene, 1-octene, 3,5,5-trimethyl-1-hexene, and combinations thereof. Examples of polymer include, but are not limited to, ethylene-based polymers, having at least 50 wt % ethylene, including ethylene-1-butene, ethylene-1-hexene, and ethylene-1-octene, among others.

The polymer can include from 50 to 95 wt % ethylene based on a total weight of the polymer. All individual values and subranges from 50 to 95 wt % are included; for example, the polymer can include from a lower limit of 50, 60, or 70 wt % ethylene to an upper limit of 95, 90, or 85 wt % ethylene based on the total weight of the polymer. The polymer can include from 5 to 50 wt % comonomer based on the total weight of the polymer. All individual values and subranges from 5 to 50 wt % are included; for example, the polymer can include from a lower limit of 5, 10, or 15 wt % comonomer to an upper limit of 50, 40, or 30 wt % comonomer based on the total weight of the polymer.

Embodiments of the present disclosure provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, or 0920 g/cm$^3$ to an upper limit of 0.970, 0.960, 0.950, or 0.940 g/cm$^3$. Density can be determined in accordance with ASTM D-792.

Embodiments of the present disclosure provide that the polymer can have a melt index (MI) or (I$_2$) as measured by ASTM-D-1238-E in the range from 0.01 dg/min to 1000 dg/min. For instance, the polymers can have a MI from 0.01 dg/min to 100 dg/min, from 0.1 dg/min to 50 dg/min, or from 0.1 dg/min to 10 dg/min.

Embodiments of the present disclosure provide that the polymer can have a Mn (number average molecular weight) from 5,000 to 75,000. All individual values and subranges from 5,000 to 75,000 are included; for example, the polymer can have a Mn from a lower limit of 5,000; 6,000; 7,000; 7,500; 8,000; or 8,500 to an upper limit of 75,000; 65,000; 55,000; 45,000; 35,000; 25,000; 24,000; 23,000; or 22,000. Mn can be determined by gel permeation chromatography (GPC), as is known in the art.

Embodiments of the present disclosure provide that the polymer can have a Mw (weight average molecular weight) from 60,000 to 110,000. All individual values and subranges from 60,000 to 110,000 are included; for example, the polymer can have a Mw from a lower limit of 60,000; 62,500; 63,000; or 63,500 to an upper limit of 110,000; 109,000; 108,000; or 107,000. Mw can be determined by GPC, as is known in the art.

Embodiments of the present disclosure provide that the polymer can have a Mz (z-average molecular weight) from 150,000 to 400,000. All individual values and subranges from 150,000 to 400,000 are included; for example, the polymer can have a Mz from a lower limit of 150,000; 155,000; 160,000; or 170,000 to an upper limit of 400,000; 375,000; 350,000; or 325,000. Mz can be determined by GPC, as is known in the art.

Embodiments of the present disclosure provide that the polymer can have a molecular weight distribution, determined as Mw/Mn (weight average molecular weight/number average molecular weight) from 3.00 to 8.00. All individual values and subranges from 3.00 to 8.00 are included;

for example, the polymer can have a Mw/Mn from a lower limit of 3.00; 3.50; 4.00; or 4.50 to an upper limit of 8.00; 7.50; 7.00; or 6.50. Mw/Mn can be determined by GPC analysis, as is known in the art.

The polymers may be formed by gas-phase polymerization processes, using known equipment and reaction conditions, i.e. known polymerization conditions. Polymer formation is not limited to any specific type of gas-phase polymerization system. As an example, polymerization temperatures may range from about 0° C. to about 300° C. Polymerization pressures, as well as other polymerization conditions, are known in the art.

A number of embodiments of the present disclosure provide that the polymers may be formed via a gas phase polymerization system, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and a temperature in the range from 30° C. to 130° C., from 65° C. to 110° C., from 75° C. to 120° C., or from 80° C. to 120° C. For a number of embodiments, operating temperatures may be less than 112° C. Stirred and/or fluidized bed gas phase polymerization systems may be utilized.

Generally, a conventional gas phase fluidized bed polymerization process can be conducted by passing a stream containing a monomer and a comonomer continuously through a fluidized bed reactor under reaction conditions and in the presence of a catalyst composition, e.g., a composition including the metallocene complex of Formula I and the activator and/or the corresponding activated metallocene complex of Formula I, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalyst composition and reactants may also be present in the gas stream. The polymerization system may include a single reactor or two or more reactors in series, for example.

Feed streams for the polymerization process may include monomer, comonomer, nitrogen, hydrogen, and may optionally include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single location or multiple and different locations.

For the polymerization process, catalyst, e.g., the metallocene complex of Formula I including the activator and/or the corresponding activated metallocene complex of Formula I, may be continuously fed to the reactor. A gas that is inert to the catalyst, such as nitrogen or argon, can be used to carry the catalyst into the reactor bed. In another embodiment, the catalyst can be provided as a slurry in mineral oil or liquid hydrocarbon or mixture such, as for example, propane, butane, isopentane, hexane, heptane or octane. The catalyst slurry may be delivered to the reactor with a carrier fluid, such as, for example, nitrogen or argon or a liquid such as for example isopentane or other $C_3$ to $C_8$.

Examples

In the Examples, various terms and designations for materials are used including, for instance, the following:

XCAT™ VP-100 (activated metallocene complex of Formula I, obtained from Univation Technologies, LLC).

Melt index ($I_2$) was determined according to ASTM D-1238-E; density was determined according to ASTM D-792.

XCAT™ VP-100 was utilized for five polymerizations. For the five polymerizations, a gas phase fluidized bed reactor was used which had a 0.57 m internal diameter and 4.0 m bed height and a fluidized bed composed of polymer granules. Fluidization gas was passed through the bed at a velocity of 1.8 to 2.2 ft/s. The fluidization gas exited the top of the reactor and passed through a recycle gas compressor and heat exchanger before re-entering the reactor below a distribution grid. A constant fluidized bed temperature was maintained by continuously adjusting the temperature of water on the shell side of a shell-and-tube heat exchanger. Gaseous feed streams of ethylene (monomer), nitrogen and hydrogen together with 1-hexene (comonomer) were introduced into a recycle gas line. The reactor was operated at a total pressure of approximately 2068 kPa gauge and vented to a flare to control pressure. Individual flow rates of ethylene, nitrogen, hydrogen and 1-hexene were adjusted to maintain desired targets. Concentrations of all gasses were measured using an on-line gas chromatograph. The catalyst was fed semi-continuously at a rate to achieve a targeted polymer production rate in the range of 60 to 75 kg/hour. The fluidized bed was maintained at constant height by withdrawing a portion of the bed at a rate equal to the rate of formation of product. Product was removed semi-continuously via a series of valves into a fixed volume chamber. A nitrogen purge removed a significant portion of entrained and dissolved hydrocarbons in the fixed volume chamber. The product was further treated with a small stream of humidified nitrogen to deactivate any trace quantities of residual catalyst and/or cocatalyst. A feed of CA-300, commercially available from Univation Technologies, LLC, was fed into reactor using at a rate sufficient to produce about 30 ppmw in the final product. Polymerization conditions and/or product properties are reported in Table 1.

TABLE 1

| | $C_6/C_2$ flow ratio (lb/lb) | $H_2$ concentration (ppmv) | $I_2$ Melt index (dg/min) | Density (g/cm³) |
|---|---|---|---|---|
| Polymerization 1 XCAT™ VP-100 | 0.0389 | 163 | 1.31 | 0.9287 |
| Polymerization 2 XCAT™ VP-100 | 0.0389 | 290 | 5.72 | 0.9339 |
| Polymerization 3 XCAT™ VP-100 | 0.0660 | 224 | 1.06 | 0.9231 |
| Polymerization 4 XCAT™ VP-100 | 0.0937 | 172 | 0.19 | 0.9134 |
| Polymerization 5 XCAT™ VP-100 | 0.0921 | 290 | 0.99 | 0.9172 |

Regression analysis, based upon the XCAT™ VP-100 Polymerizations 1-5, was utilized to provide the following equations:

$$\text{Ln(Melt Index)} = -0.4276 + 0.0124(H_2\text{ppm}) - 35.1929\left(\frac{C_6}{C_2}\text{flow ratio}\right) \quad \text{Equation 1}$$

$$\text{Density} = 0.9351 + 3.455e - 5(H_2\text{ppm}) - 0.2989\left(\frac{C_6}{C_2}\text{flow ratio}\right) \quad \text{Equation 2}$$

The regression analysis utilized the hydrogen concentration and the comonomer concentration.

FIG. 1 illustrates a plot of density (g/cm³) vs 12 melt index (dg/min) generated utilizing Equations 1-2. For the plot, the respective $C_6/C_2$ flow ratios corresponding to various polymers were maintained as constants at approximately 0.092. As shown in FIG. 1, a polymer 120 corresponded to a density of approximately 0.9177 g/cm³ and a melt index of approximately 0.94 dg/min; polymer 120 corresponded to a $H_2$ concentration of approximately 296 ppmv.

As shown in FIG. 1, throughout the entire plot the density of polymers significantly decreases with decreasing $H_2$ concentration. Polymer 130, which corresponded to both the lowest $H_2$ concentration and the lowest density of the plot in FIG. 1 corresponded to a $H_2$ concentration of approximately 60 ppmv, and a density of approximately 0.9097 g/cm³ and melt index of approximately 0.05 dg/min.

What is claimed:

1. A method for controlling a polymerization reaction, the method comprising:
   determining an instantaneous density model for a gas-phase activated metallocene complex polymerization, wherein the instantaneous density model incorporates:
   a hydrogen concentration for the activated metallocene complex gas-phase polymerization and comonomer concentration for the gas-phase activated metallocene complex polymerization; and
   utilizing the instantaneous density model to monitor the polymerization reaction to determine if a threshold instantaneous density is reached.

2. The method of claim 1, wherein the activated metallocene complex of the gas-phase activated metallocene complex polymerization is provided by activating a metallocene complex represented by Formula I:

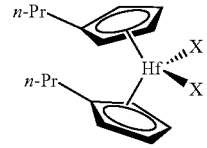

Formula I wherein each n-Pr is n-propyl, and each X is independently $CH_3$, Cl, Br, or F.

3. The method of claim 1, wherein the instantaneous density incorporates instantaneous process conditions determined from a mass balance in-between analyzer updates.

4. The method of any claim 1, where the threshold instantaneous density is determined from a stickiness model.

5. The method of claim 1, where the threshold instantaneous density is determined from a stickiness model using instantaneous process conditions determined from a mass balance in-between analyzer updates.

6. The method of claim 1, where the threshold instantaneous density is a preset value.

7. The method of claim 1, comprising killing the polymerization reaction when the threshold instantaneous density is reached.

8. The method of claim 7, wherein killing the polymerization reaction includes slowing and/or stopping the polymerization reaction.

9. The method of claim 7, wherein killing the polymerization reaction includes injecting a kill material into a polymerization reactor.

10. The method of claim 9, wherein the kill material is carbon monoxide.

* * * * *